O. H. HINDS.
TIRE.
APPLICATION FILED NOV. 15, 1910.

1,002,693.

Patented Sept. 5, 1911.

WITNESSES:
L. H. Schmidt
Perry B. Turpin

INVENTOR
Ozro H. Hinds,
BY Munn & Co.
ATTORNEYS

UNITED STATES PATENT OFFICE.

OZRO H. HINDS, OF LE MARS, IOWA.

TIRE.

1,002,693. Specification of Letters Patent. Patented Sept. 5, 1911.

Original application filed October 27, 1910, Serial No. 589,324. Divided and this application filed November 15, 1910. Serial No. 592,547.

*To all whom it may concern:*

Be it known that I, OZRO H. HINDS, a citizen of the United States, and a resident of Le Mars, in the county of Plymouth and State of Iowa, have invented certain new and useful Improvements in Tires, of which the following is a specification.

This invention is an improvement in tires and particularly in the means for excluding dust, dirt and the like from the joint between the flanges of the rim and the tire which is movable radially in said flanges, the present application being a division of an application No. 589,324, filed October 27, 1910; and the present invention consists in certain novel constructions and combinations of parts as will be hereinafter described and claimed.

Figure 1:
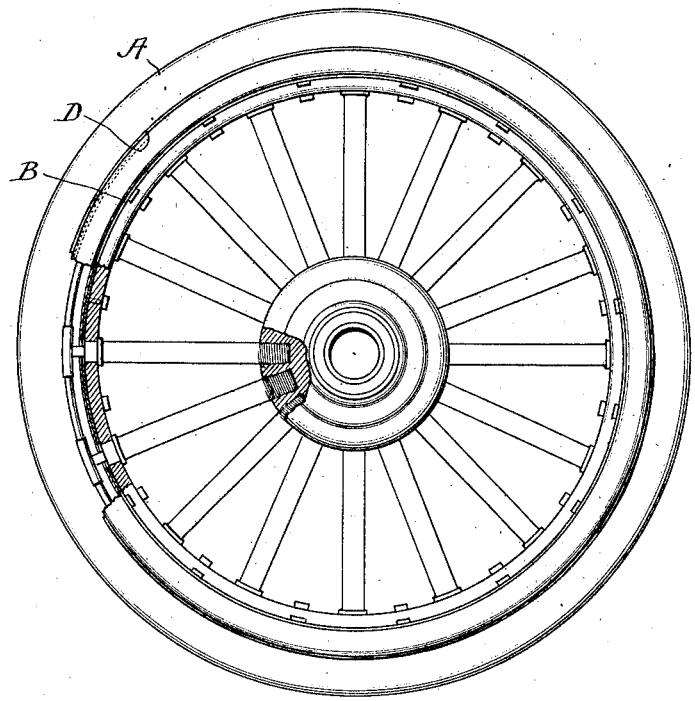
Figure 3:
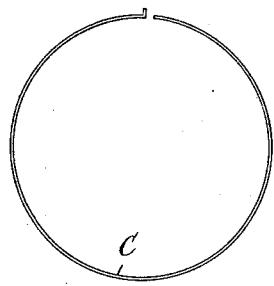
Figure 2:
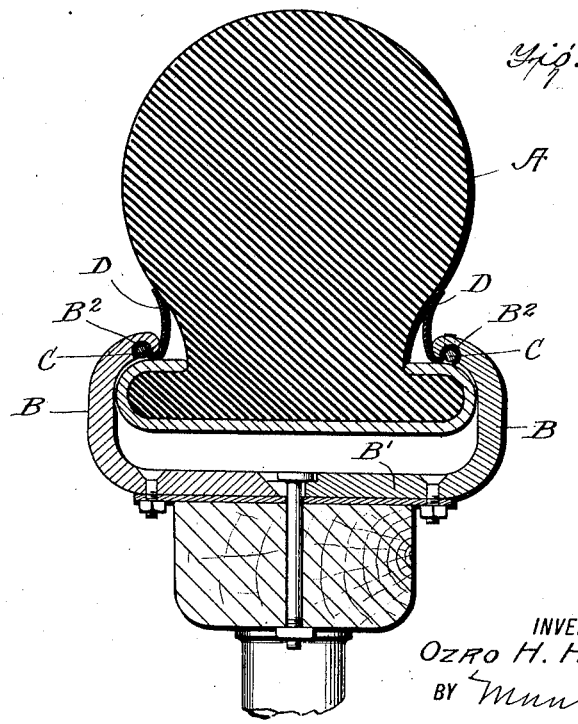

In the drawing Figure 1 is a side view, partly in section and partly broken away, of a wheel provided with my improvements. Fig. 2 is a detail enlarged section illustrating the connection of the apron with the tire and rim flange. Fig. 3 is a detail side view of the open spring ring for securing the dust excluding apron.

In carrying out the invention, I provide in connection with the tire A and the rim flanges B in which the tire A is movable radially, means for spring supporting the tire so it can yield radially under pressure, and these means may be, such for instance, as shown and described in my former application above referred to, or they may be otherwise without departing from some of the broad principles of my invention, wherein, it will be noticed, the tire A is movable radially within the flanges B of the rim B′ and the problem in the present invention is to exclude dust, dirt, gravel and the like from the joint between the tire and the rim flanges, especially when the tire moves inwardly from the rim flanges.

In carrying out this feature of my invention I provide the tire with an apron which is attached to the clencher or rim to keep out the dust so the tire can work up and down in a clencher or rim and the apron will remain firm at the end which is attached to the clencher rim and manifestly these aprons are employed at both sides of the tire.

In the specific construction shown, the flanges B of the rim B′ are provided in their inner faces with annular grooves $B^2$ adapted to receive the spring wire open ring C, which, when sprung into the groove $B^2$, will operate to securely hold the inner edge of its respective apron D to the flange, as best shown in Fig. 2 of the drawing. At their outer edges, the aprons D are fixed in relation to the tire A at the sides thereof.

It is manifest that in the use of the invention, the aprons can be conveniently secured in place within the flanges B of the rim B′ and to facilitate the connection of the aprons, it may be preferred to make the opposite rim flanges separate, as will be understood from Fig. 2 of the drawing.

I claim:

1. The improvement in wheels, substantially as herein described, comprising tire securing flanges, a tire movable radially within the tire securing flanges, the said flanges being provided in their inner faces with circumferentially extending grooves, guard aprons extending between the tire and the rim flanges and open spring wire rings securing the guard aprons within the grooves of the flanges, substantially as set forth.

2. The improvement in wheels herein described, comprising tire securing flanges projecting inwardly toward each other at their outer edges and having in the inner walls of said inwardly projecting portions grooves facing inwardly toward the center of the wheel, a tire having laterally projecting flanges held within the flanges of the rim and underlying the inwardly projecting portions of said flanges and overlapping the inwardly facing grooves therein, guard aprons secured at their outer edges to the body of the tire and extending thence between the tire flanges and the inwardly facing portions of the rim flanges and means securing the inner edges of the aprons within the inwardly facing grooves of the rim flanges, substantially as set forth.

OZRO H. HINDS.

Witnesses:
W. F. HUEPACH,
W. G. BOLSER.

Copies of this patent may be obtained for five cents each, by addressing the "Commissioner of Patents, Washington, D. C."